United States Patent [19]

Leung et al.

[11] Patent Number: 5,340,777
[45] Date of Patent: Aug. 23, 1994

[54] CARBON-CONTAINING BLACK GLASS FROM HYDROSILYLATION-DERIVED SILOXANES

[75] Inventors: Roger Y. Leung, Schaumburg, Ill.; John G. Sikonia, Long Valley, N.J.

[73] Assignee: AlliedSignal Inc., Morris Township, Morris County, N.J.

[21] Appl. No.: 96,494

[22] Filed: Jul. 23, 1993

Related U.S. Application Data

[63] Continuation-in-part of Ser. No. 2,049, Jan. 9, 1987, Pat. No. 5,242,866, which is a continuation-in-part of Ser. No. 816,269, Dec. 23, 1991.

[51] Int. Cl.$^5$ .............................................. C03C 3/00
[52] U.S. Cl. ................................. 501/12; 501/32; 501/55; 428/429; 528/37
[58] Field of Search ............ 428/429, 447; 528/27, 528/37, 40; 501/12, 32, 55

[56]         References Cited
         U.S. PATENT DOCUMENTS

| | | | |
|---|---|---|---|
| Re. 32,107 | 4/1986 | January | 501/12 |
| 3,197,432 | 7/1965 | Lamoreaux | 260/46.5 |
| 3,197,433 | 7/1965 | Lamoreaux | 260/46.5 |
| 3,378,431 | 4/1968 | Smith et al. | 161/1 |
| 3,957,717 | 5/1976 | Harada et al. | 260/37 SB |
| 4,877,820 | 10/1989 | Cowan | 523/222 |
| 4,900,779 | 2/1990 | Liebfried | 524/862 |
| 5,128,494 | 7/1992 | Blum | 556/457 |
| 5,180,694 | 1/1993 | Renlund et al. | 501/12 |
| 5,231,059 | 7/1993 | Leung et al. | 501/12 |
| 5,242,866 | 9/1993 | Leung et al. | 501/12 |
| 5,266,533 | 1/1993 | Leung et al. | 501/12 |

FOREIGN PATENT DOCUMENTS 0412428  2/1991  Fed. Rep. of Germany .

OTHER PUBLICATIONS

Ceramic Engineering & Science Proceedings, vol. 12, No. 7/8, Aug. 1991 F. I. Hurwitz et al. "Polymeric Routes to Silicon Carbide & Silicon Oxycarbide CMC", pp. 1292–1303.

Elmer and Meissner (Journal of the American Ceramic Society), 59, 206, 1976.

Primary Examiner—Karl Group
Assistant Examiner—Chris Gallo
Attorney, Agent, or Firm—Harold N. Wells; Mary J. Boldingh; Roger H. Criss

[57]          ABSTRACT

Carbon-containing black glass compositions of matter having the empirical formula $SiC_xO_y$ and derived from the precursor polymers obtained by reacting (a) cyclo siloxanes and (b) non-cyclic siloxanes, each of the reactants having either or both of hydrogen and an unsubstituted vinyl group whereby a polymer is formed by a hydrosilylation reaction.

17 Claims, No Drawings

CARBON-CONTAINING BLACK GLASS FROM HYDROSILYLATION-DERIVED SILOXANES

This is a continuation-in-part of USSN 07/002,049 filed Jan. 9, 1987 now U.S. Pat. No. 5,242,866 and of USSN 07/816,269, filed Dec. 23, 1991.

BACKGROUND OF THE INVENTION

Ceramics have been used as coatings or as fabricated parts and are employed wherever their characteristics such as durability, nonporosity, electrical conductivity or nonconductivity, and heat protection are required. One of the more recent ceramic materials is a silicon-carbon-oxygen system, named as a black glass, which can find use in certain situations where extremely high temperatures are present. The parent applications provide an extended discussion of the art which is incorporated by reference herein. The following discusses a few of the more significant related portions of the earlier art.

Traditionally, the introduction of carbon in glasses was made by impregnating porous glass with a concentrated solution of an organic compound and subsequently firing in a reducing or neutral atmosphere. The carbon-containing product is generally regarded as a composite containing carbon and silica. See for example, Elmer and Meissner (*Journal of the American Ceramic Society*, 59, 206, 1976) and Smith & Crandall, U.S. Pat. No. 3,378,431.

Carbon-modified silica glass has been used as a composite matrix by Larsen, Harada and Nakamum (Report No. AFWAS-TR-83-4134, December, 1983, Wright-Patterson AFB, Ohio). In producing fiber-reinforced composites, the processing sequence includes slurry impregnation of silicon carbide fiber in an aqueous slurry of a carbowax (polyethylene glycol) and a silicon-containing compound known in the trade as Cab-O-Sil (a silicon dioxide powder manufactured by Cabot), layout of prepregged fiber tows, and hot-pressing.

More recently, formation of carbonaceous ceramics has been carried out through the use of the sol-gel process. For example, January discloses in U.S. Pat. No. RE 32,107 the use of the sol gel process to form monolithic glasses containing carbon through pyrolysis of the gels of organosilsesquioxanes, metal oxides and metal alkoxides. The gelling process is based on the following reaction:

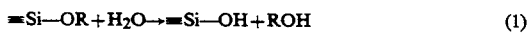

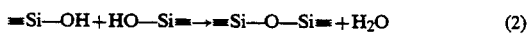

in which R represents an organic radical such as alkyl groups and aryl groups such as phenyl group.

Although the sol-gel process can produce homogeneous, purer glassy products by low temperature processes, monolithic black glasses produced via hydrolysis and condensation of organoalkoxysilanes require very long drying periods and delicate gelling conditions. The very slow drying rate is necessary for reducing cracks during the gelation period. These cracks form as a result of the non-uniform surface tensions created by the evaporation of the water or alcohol molecules produced in the hydrolysis (1) and condensation (2) reactions.

N. Harada and M. Tanaka in U.S. Pat. No. 3,957,717 described and claimed an organopolysiloxane gel prepared from cyclosiloxanes and H. Lamoreaux in U.S. Pat. Nos. 3,197,432 and 3,197,433 claimed the product gel from reacting cyclosiloxanes containing hydrogens and vinyl groups. The basic idea of reacting silyl hydrogen groups with silyl vinyl groups is found in U.S. Pat. Nos. 3,439,014 and 3,271,362.

Liebfried, in U.S. Pat. No. 4,900,779, discloses polymers which combine cyclic polysiloxanes or tetrahedral siloxysilanes with polycyclicpolyenes having no silicon atoms. In U.S. Pat. No. 5,013,809, Liebfried suggests including linear short chain ≡SiH terminated polysiloxanes to the compositions of the '779 patent. Pyrolysis of these polymers to form ceramics is suggested. In U.S. Pat. No. 4,877,820, Cowan discloses a related composition in which polycyclicpolyenes are combined with poly(organohydrosiloxanes).

The present invention is concerned with the product of pyrolyzing polymers formed from silicon compounds to produce black glasses which are similar to those disclosed in the parent disclosures, USSN 07/002,049 and 07/816,269, but are derived from mixtures of cyclosiloxanes with non-cyclic siloxanes.

BRIEF SUMMARY OF THE INVENTION

The invention includes a carbon-containing black glass composition of matter in which up to about 40 wt. % carbon is incorporated. Such carbon-containing black glass ceramic compositions have the empirical formula $SiC_xO_y$ wherein x is about 0.5 to about 2.0, preferably 0.9 to 1.6 and y is about 0.5 to about 3.0, preferably 0.7 to 1.8 and are derived from the process described below.

Another aspect of this invention is found in a process to produce a black glass comprising making a precursor polymer by reacting compounds containing silicon-vinyl bonds with compounds containing silicon-hydride bonds in the presence of a catalytic effective amount of a hydrosilylation catalyst, said compounds being:

(a) cyclosiloxanes of formula

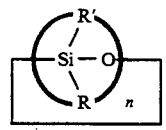

where n is an integer from 3 to about 20, R and R' are independently selected from hydrogen, an unsubstituted vinyl group, a substituted vinyl group, an alkyl group having 1 to 20 carbon atoms, or aryl and where said siloxane contains at least two of either or both of hydrogen and unsubstituted or substituted vinyl groups and (b) non-cyclic siloxanes having the formula

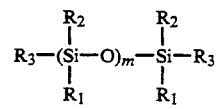

where
$R_1$, $R_2$, and $R_3$ are independently selected from hydrogen, an unsubstituted vinyl group, a substituted vinyl group, an alkyl group having 1 to 20 carbon atoms or aryl and where said siloxane contains at least two of either or both of hydrogen and unsubstituted or substituted vinyl groups m is an integer from 0 to 1,000 and thereafter converting the polymer to a black glass by heating in an inert atmosphere to a maximum temperature in the range of 750° C. to 1400° C. or in an oxygen-containing atmosphere to the same temperature range at a rate exceeding 5° C./min. The siloxanes of (b) are intended to include both linear siloxanes and their branched equivalent structures. In the special case where m is zero, the non-cyclic siloxane (b) becomes a silane having only one silicon atom.

In one alternative embodiment, a precursor polymer is produced by reacting the non-cyclic siloxanes described in (b) above (or a branched equivalent) in the absence of the cyclosiloxanes of (a) above. Such polymers are then pyrolyzed as described above to create a black glass.

Close coupling of silicon and carbon atoms is preferred. However, in some embodiments, the precursor polymers of (a) and (b) contain substituted vinyl groups instead of unsubstituted vinyl groups for at least one of R, R', $R_1$, $R_2$, and $R_3$, respectively, or at least one of R, R', $R_1$, $R_2$, and $R_3$ are aryl groups or alkyl groups having more than 2 carbon atoms. Such precursor polymers will produce carbon which is less bound to silicon atoms and is removed more readily by heating in an oxygen-containing atmosphere. The resulting black glass will have greater porosity and will have applications where such porosity is desirable.

The black glass ceramic may be reinforced with fillers such as powders, whiskers and fibers.

DETAILED DESCRIPTION OF THE INVENTION

Precursor Polymers

The black glass of the invention is derived from precursor polymers prepared by the reaction of (a) cyclosiloxanes containing silicon-hydride bonds and/or silicon-vinyl bonds with (b) non-cyclic siloxanes (or silanes with one silicon atom) also having silicon-hydride and/or silicon-vinyl bonds. Such precursor polymers may be described as the reaction product of (a) cyclosiloxanes of the formula

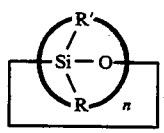

where n is an integer from 3 to about 20, R and R' are independently selected from hydrogen, an unsubstituted vinyl group, a substituted vinyl group, an alkyl group of from 1 to about 20 carbon atoms, or aryl and where said siloxane contains at least two of either or both of hydrogen and unsubstituted or substituted vinyl groups and (b) non-cyclic siloxanes having the formula

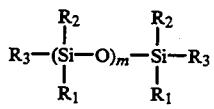

$R_1$, $R_2$, and $R_3$ are independently selected from hydrogen, an unsubstituted vinyl group, a substituted vinyl group, an alkyl group having 1 to 20 carbon atoms, or aryl and where said siloxane contains at least two of either or both of hydrogen and unsubstituted or substituted vinyl groups m is an integer from 0 to 1,000 said reaction taking place in the presence of an effective amount of a hydrosilylation catalyst.

It should be noted that in one case where m=0 that the "non-cyclic siloxane" of (b) is actually a silane. A number of examples are given below which combine silanes with cyclosiloxanes. Accordingly, it is to be understood that silanes having a single silicon atom are included within the term "non-cyclic siloxanes" as defined herein.

The siloxane molecules (a) and (b) are linked by the reaction of a hydrogen atom from one molecule and a vinyl group from the other. It is believed that the improved high temperature performance of black glasses of the invention is related to the relatively close coupling of the silicon and carbon atoms.

While unsubstituted vinyl groups are preferred, in some instances a substituted vinyl group may be selected to create carbon less closely bound to silicon atoms. An unsubstituted vinyl group may be written as —CH=CH$_2$ while a substituted vinyl group may be written as —CR$_a$=CR$_b$R$_c$ where R$_a$, R$_b$, R$_c$ may be hydrogen, alkyl groups from 1 to 20 carbons, aryl, alkaryl, or alkenyl, with at least some of R$_a$, R$_b$, R$_c$ being other than hydrogen. Additional carbon may be added also by including aryl groups or alkyl groups having more than 2 carbon atoms.

In one alternative embodiment, a precursor polymer is produced by reacting the non-cyclic siloxanes described in (b) above (or a branched equivalent) in the absence of the cyclosiloxanes of (a) above. Such polymers are then pyrolyzed as described above to create a black glass.

The precursor polymers may be prepared by heating a mixture of a cyclosiloxane with a non-cyclic siloxane (including silanes having one silicon atom) containing silicon-hydride and silicon-vinyl bonds to a temperature in the range of from about 10° C. to about 300° C. in the presence of a platinum hydrosilylation catalyst present at 1–200 wt. ppm Pt for a time in the range of from about 1 minute to about 600 minutes. The resulting polymer is converted to black glass by pyrolyzing in an inert atmosphere at a maximum temperature in the range from about 750° C. to about 1400° C. for a time in the range of from about 1 hour to about 300 hours, or by rapid heating in an oxidizing atmosphere to the same temperature range. The polymer formation step from the monomer takes advantage of the fact that a silicon-hydride will react with a silicon-vinyl group to form a silicon-carbon-carbon-silicon or a silicon-carbon-silicon bonded chain, thereby forming a network polymer. Thus, the reacting cyclosiloxanes and non-cyclic siloxanes (including silanes having one silane atom) will contain at least two of either a silicon-hydride bond or a silicon-vinyl bond or both. A "silicon-hydride bond" refers to a silicon atom bonded directly to a hydrogen atom and a "silicon-vinyl bond" refers to a silicon atom bonded directly to an alkene carbon atom i.e. an atom which is attached by a double bond to an adjacent carbon atom.

Conversion of the gel polymer to black glass by heating in an inert atmosphere takes place between 430° C. and 950° C., but a higher maximum temperature may be used if desired, up to about 1400° C. The yield of the gel-glass conversion to black glass varies from 38% to 83%.

Platinum is the preferred hydrosilylation catalyst. Other catalysts such as cobalt and manganese carbonyl will perform adequately. The catalyst can be dispersed as a solid or can be used as a soluble complex in solution when added to the cyclosiloxane monomer.

Examples of cyclosiloxanes include, but are not limited to,
1,3,5,7-tetravinyl-1,3,5,7-tetrahydrocyclotetrasiloxane,
1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3,5,7,9,11,13,15,17,19,21,23,25,27,29-pentadecavinylpentadecahydrocyclopentadecasiloxane,
1,3,5,7-tetrapropenyltetrahydrocyclotetrasiloxane,
1,3,5,7-tetrapentenyltetrapentylcyclotetrasiloxane,
1,3,5,7,9-pentadecenylpentapropylcyclopentasiloxane
1,3,5,7,9-pentahydropentamethylcyclopentasiloxane
1,1,3,3,5,5,7,7-octahydrocyclotetrasiloxane
1,1,3,3,5,5,7,7,9,9,-decahydrocyclopentasiloxane, and
1,1,3,3,5,5,7,7,9,9,11,11-dodecahydrocyclohexasiloxane.

Examples of linear non-cyclic siloxanes are:
tetramethyldisiloxane,
hexamethyltrisiloxane,
1,1,2,3,3-pentamethyltrisiloxane,
octamethyltetrasiloxane,
polymethylvinylsiloxane,
polyhydromethylsiloxane,
heptamethyltetrasiloxane,
1,1,2,3,4,4,-hexamethyltetrasiloxane,
decamethylpentasiloxane,
1,1,2,3,4,5,5-hepatmethylpentasiloxane,
1,1,3,3-tetravinyldimethyldisiloxane,
tetramethyldivinyldisiloxane,
hexamethyldivinyltrisiloxane,
1,1,2,3,3-pentamethyltrivinyltrisiloxane,
octamethyldivinyltetrasiloxane,
heptamethyltrivinyltetrasiloxane,
1,1,2,3,4,4-hexamethyltetravinyltetrasiloxane,
decamethyldivinylpentasiloxane, and
1,1,2,3,4,5,5-hepatmethylpentavinylpentasiloxane, Examples of branched non-cyclic siloxanes are:
tetrakis dimethylsiloxysilane, and
tetrakis dimethylvinylsiloxysilane Examples of silanes (i.e, m is zero in formula (b)) are:
tetravinylsilane,
trivinylsilane,
divinylsilane,
trivinylmethylsilane,
divinylmethylsilane,
silane ($SiH_4$),
vinylsilane,
divinyldiethylsilane,
diphenyldivinylsilane,
phenylsilane,
methylphenylsilane,
diphenylsilane,
2-propenyldimethylsilane,
1-propenyldimethylsilane,
3-propenyldimethylsilane,
4-but-2-enyldiethylsilane,
p-tolylsilane, and
p-tolyldivinylsilane

Producing Black Glass

The precursor polymer may be converted into a monolith using procedures such as tape casting, injection molding, reaction injection molding, and compression molding. For instance, the precursor polymer may be introduced into a mold and then heated to form a monolithic black glass precursor polymer or extruded through a heated die to form a precursor polymer monolith. The monolith would then be pyrolyzed as previously described to form the black glass monolith.

The black glass product may be impregnated with the monomer reaction mixture and subsequently pyrolyzed to produce a black glass with less cracks and voids and with greater density. Impregnation can be repeated to further increase the density of the black glass product.

The monomeric mixture can include a filler such as cubic or hexagonal silicon carbide, silicon nitride, silica, alumina, hafnia, titania, and zirconia to strengthen the resulting monolith. Such a filler in the form of a powder, whisker, or fiber can be mixed into the monomer using conventional means, for example, the preparation of prepregs (i.e., fiber-reinforced prepolymers or partially cured polymers) which can be combined to form desired shapes. The filled product produced shows not only increased strength but also exhibits less shrinkage after the pyrolysis step. Pyrolysis of the precursor polymers changes them into very hard ceramic bodies that can find application in high temperature, oxidation-resistant, high strength composite matrices and castable ceramics.

The black glass has an empirical formula $SiC_xO_y$ wherein x is about 0.5 to about 2.0, preferably 0.9 to 1.6, and y is about 0.5 to about 3.0, preferably 0.7 to 1.8. The carbon content ranges up to about 40%.

Both non-porous as well as porous black glass can be produced. For most purposes, it is preferred to use neat monomers to form non-porous black glass, but porous black glass can be formed if so desired by starting with mixtures of monomers in a solvent. Alternatively, selecting monomers containing carbon atoms not closely attached to silicon atoms produces free carbon which can be oxidized to increase porosity as described above.

EXAMPLE I

A series of polymers precursors were produced by reacting (a) cyclosiloxanes with either (b) non-cyclic linear siloxanes, or silanes, each having at least two of either or both of silicon-hydride bonds or silicon-vinyl bonds according to the invention. The monomers were:

Cyclosiloxanes a-1 methylvinylcyclosiloxane (MVCS)
a-2 hydromethylcyclosiloxane (HMCS)

Linear Siloxanes b-1 polyhydromethylsiloxane (PHMS)
b-2 1,1,3,3-tetramethyldisiloxane (MM)
b-3 1,1,3,5,5-hexamethyltrisiloxane (MDM)

Silanes
c-1 tetravinylsilane
c-2 diphenyldivinylsilane
c-3 phenylsilane
c-4 methylphenylsilane
c-5 diphenylsilane Mixture of two of the silicon compounds were reacted, one from (a) cyclosiloxanes and the second from (b) either linear siloxanes or silanes (i.e. where m is zero). Equal molar amounts of vinyl and hydride groups were used. About 20–40 wt. ppm Pt in a platinummethyl-vinylcyclosiloxane complex, was added to the mixture, which was heated to 55° C. in an oven overnight. The results of the reactions are reported in the following table.

| Sample No. | Siloxane Cyclo | Siloxane Linear | Silane | Polymer |
|---|---|---|---|---|
| 1 | a-1 | b-1 | — | gel |
| 2 | a-1 | b-2 | — | gel |
| 3 | a-1 | b-3 | — | gel |
| 4 | a-1 | — | c-3 | gelled slowly |
| 5 | a-1 | — | c-4 | tough gel, slow reaction |
| 6 | a-1 | — | c-5 | liquid |
| 7 | a-2 | — | c-1 | gelled quickly |
| 8 | a-2 | — | c-2 | liquid |
| 9 (std) | a-1/a-2 | — | — | gel |

Some observations which may be made concerning these results are

Sample 9 represents polymers of the parent applications SN 07/002,049 and SN 07/816,269 where the monomers are both cyclosiloxanes Samples 6 and 8 indicate that the presence of two phenyl groups may have inhibited reactivity and no gel polymer was formed.

Samples 4 and 5 show that silanes having only one phenyl group react slowly.

Sample 5 shows that the use of silanes having one phenyl group and one methyl group produces a unique tougher gel polymer.

EXAMPLE 2

The polymers formed in Example 1 were pyrolyzed in flowing nitrogen while heating to a temperature of 850° C. over 8 hours and then held at 850° C. for ½ hour, followed by cooling to room temperature. The resulting black glasses were analyzed by Leco carbon and silicon atomic absorption methods and are compared in the following table.

| Sample No. | Char Yield, wt. % | Carbon, wt. % | Silicon, wt. % | H, wt. % | N, wt. % (b) |
|---|---|---|---|---|---|
| 1 85 cs(a) | 80.4 | 27 | 46 | 0.8 | 0.01 |
| 30 cs | 82.9 | 25 | 47 | 1 | 0.01 |
| 20 cs | 81.4 | 26 | 46 | 0.6 | — |
| 2 | 52.1 | 27 | 46 | 1 | 0.1 |
| 3 | 39.1 | 23 | 46 | 1 | 0.03 |
| 4 | 71.5 | 40 | 38 | 1.3 | 0.01 |
| 5 | 61 | 46 | 38 | 0.9 | 0.1 |
| 7 | 80.4 | 26 | 47 | 0.8 | 0.01 |
| 9 (std) | 84 | 27 | 46 | 0.2 | 0.2 |

(a) Three samples of b-1 (PHMS) having different molecular weights and designated by their visosities, cs=centistoke (b) The balance of the sample weight is assigned to oxygen.

Some observation which may be made concerning these results are:

The char yield is generally less when linear siloxanes or silanes are included as compared to Sample 9 where both reactants are cyclosiloxanes.

High char yields were obtained for Sample 1 with polyhydromethylsiloxane and for Sample 7 with tetravinylsilane.

The phenyl-containing compounds (Samples 4–5) provide a lower char yield and a higher carbon content, but this is apparently free carbon as will be seen below.

In Sample 1 polyhydromethylsiloxanes of three different molecular weights produce black glasses with similar char yields and compositions. The molecular weights of the 85 cs, 30 cs, and 20 cs linear siloxanes (b-1) are about 5000, 2300, and 1800, respectively.

EXAMPLE 3

Two gram samples of each of the black glasses produced in Example 2 were exposed to stagnant air at 958° C. for 30 hours to determine their thermal stability. The weight loss is reported in the following table.

| Sample No. | | Char Yield, wt. % | Weight Loss, wt. % |
|---|---|---|---|
| 1 | 85 cs | 80.4 | 0.9 |
| | 30 cs | 82.9 | 1.1 |
| | 20 cs | 81.4 | 1.8 |
| 2 | | 52.1 | 2.5 |
| 3 | | 39.1 | 5.9 |
| 5 | | 61 | 18.3 |
| 7 | | 80.4 | 1.5 |
| 9(a) | | 84 | 1 |

(a) The results of such testing with Sample 9 (standard) would show about 84% char yield and 1% weight loss.

The following observations may be made regarding the above results:

Free carbon is removed by heating in air. Sample 5 shows that the carbon from phenyl groups is readily removed.

Samples of 1 indicate that shorter chain lengths (lower viscosity) produce more free carbon than do longer chain lengths in polyhydromethylsiloxane.

Samples 2 and 3 indicate that hexamethyltrisiloxane produces more free carbon than tetramethyldisiloxane.

EXAMPLE 4

The solid state $^{29}$Si nuclear magnetic resonance spectrum of the black glass produced in Example 2 Sample 1 20 cs (MVCS/PHMS-20cs) was obtained and resolved into 4 peaks.

| Chemical Shift | Concentration | Assignment |
|---|---|---|
| −4 ppm | 17% | $SiC_4$; $SiC_3O$ |
| −29 ppm | 37% | $SiC_2O_2$ |
| −66 ppm | 30% | $SiCO_3$ |

-continued

| Chemical Shift | Concentration | Assignment |
| --- | --- | --- |
| −102 ppm | 16% | SiO$_4$ |

EXAMPLE 5

The solid state $^{29}$Si nuclear magnetic resonance spectrum of the black glass produced in Example 2 Sample 3 (MVCS/MDM) was obtained and resolved into 5 peaks.

| Chemical Shift | Concentration | Assignment |
| --- | --- | --- |
| 8 ppm | 10% | SiC$_3$O |
| −5 ppm | 17% | SiC$_4$ |
| −29 ppm | 34% | SiC$_2$O$_2$ |
| −68 ppm | 24% | SiCO$_3$ |
| −103 ppm | 15% | SiO$_4$ |

EXAMPLE 6

The solid state $^{29}$Si nuclear magnetic resonance spectrum of the black glass produced in Example 2 Sample 2 (MVCS/MM) was obtained and resolved into 5 peaks.

| Chemical Shift | Concentration | Assignment |
| --- | --- | --- |
| 6 ppm | 13% | SiC$_3$O |
| −7 ppm | 15% | SiC$_4$ |
| −29 ppm | 33% | SiC$_2$O$_2$ |
| −68 ppm | 24% | SiCO$_3$ |
| −103 ppm | 15% | SiO$_4$ |

Comparison of the results of the NMR spectra in Examples 4–6 suggest that about 85% of the silicon atoms have at least one carbon bonded to them.

We claim as our invention:

1. A precursor polymer of a black glass ceramic, said polymer being the product of reacting compounds containing silicon-vinyl bonds with compounds containing silicon-hydride bonds, in the presence of catalytically effective amount of a hydrosilylation catalyst, said compounds being (a) cyclosiloxanes of the formula

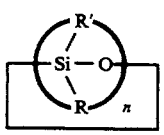

where n is an integer from 3 to about 20,

R and R' are independently selected from hydrogen, an unsubstituted vinyl group, a substituted vinyl group, an alkyl group have 1 to 20 carbon atoms, or aryl and where said siloxane contains at least two of either or both of hydrogen and substituted or unsubstituted vinyl groups and (b) non-cyclic siloxanes having the formula

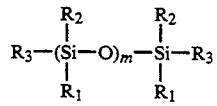

R$_1$,R$_2$, and R$_3$ are independently selected from hydrogen, an unsubstituted vinyl group, a substituted vinyl group, an alkyl group having 1 to 20 carbon atoms, or aryl and where said siloxane contains at least two of either or both of hydrogen and unsubstituted or substituted vinyl groups m is an integer from 0 to 1,000.

2. A precursor polymer of claim 1 wherein n is 3 to 6.

3. A precursor polymer of claim 1 wherein (a) is methyl vinylcyclosiloxane.

4. A precursor polymer of claim 1 wherein (a) is hydromethylcyclosiloxane.

5. A precursor polymer of claim 1 wherein (b) is polyhydromethylsiloxane.

6. A precursor polymer of claim 1 wherein (b) is 1,1,3,3-tetramethyldisiloxane.

7. A precursor polymer of claim 1 wherein for (b) m is zero and said siloxane is tetravinylsilane.

8. A precursor polymer of claim 1 wherein for (b) m is zero and said siloxane is phenylsilane.

9. A precursor polymer of claim 1 wherein for (b) m is zero and said siloxane is methylphenylsilane.

10. A black glass ceramic resulting from heating the precursor polymer of claim 1 in a non-oxidizing atmosphere to a temperature in the range of from about 750° C. to about 1400° C. or in an oxidizing atmosphere at rate exceeding 5° C./min to the same temperature range.

11. A black glass ceramic of claim 10 having the empirical formula SiC$_x$O$_y$ where x is about 0.5 to about 2.0 and y is about 0.5 to about 3.0.

12. A black glass ceramic of claim 12 wherein x is 0.9 to 1.6 and y is 0.7 to 1.8.

13. A precursor polymer of a black glass ceramic, said polymer being the product of reacting, in the presence of a catalytically effective amount of a hydrosilylation catalyst, non-cyclic siloxanes having the formula

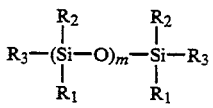

R$_1$R$_2$, and R$_3$ are independently selected from hydrogen, an unsubstituted vinyl group, a substituted vinyl group, an alkyl group having 1 to 20 carbon atoms, or aryl and said siloxanes contain at least two of either or both of hydrogen and unsubstituted or substituted vinyl groups m is an integer from 0 to 1,000.

14. A precursor polymer of a black glass ceramic of claim 1 wherein at least one of R, R', R$_1$, R$_2$, or R$_3$ is an aryl in an aryl group.

15. A precursor polymer of a black glass ceramic of claim 1 wherein at least one of R, R', R$_1$, R$_2$, or R$_3$ is a substituted vinyl group.

16. A precursor polymer of a black glass ceramic of claim 1 wherein at least one of R, R', R$_1$, R$_2$, or R$_3$ is an alkyl group containing more than 2 carbon atoms.

17. A black glass ceramic of claim 10 reinforced with fillers in the form of powder, whiskers, or fibers.

* * * * *

UNITED STATES PATENT AND TRADEMARK OFFICE
CERTIFICATE OF CORRECTION

PATENT NO. : 5,340,777
DATED : Aug. 23, 1994
INVENTOR(S) : Leung et al.

It is certified that error appears in the above-indentified patent and that said Letters Patent is hereby corrected as shown below:

Title Page,
Related U.S. Application Data:   After "Ser. No. 816,269, Dec. 23, 1991" insert --U.S. Pat. 5,328,976--.

Attorney, Agent, or Firm:   "Mary J. Boldingh" should read --Mary Jo Boldingh--

Column 1, line 7:   After "filed Dec. 23, 1991" add --now U.S. Pat. 5,328,976--

Column 7, line 12:   insert "-" after --platinum-- and before --methyl--

Column 8, line 2:   "visosities" should read --viscosities--

Column 10, line 38(Claim 12)   reference should be to Claim "11"

Column 10, line 50:   insert "," after $R_1$

Column 10, line 55:   the sentence "m is an integer from 0 to 1,000" should be on a separate line Column 10, line 59:   delete "in an aryl"

Signed and Sealed this

Seventeenth Day of January, 1995

Attest:

BRUCE LEHMAN

Attesting Officer     Commissioner of Patents and Trademarks